Feb. 16, 1943.  F. HAUSER  2,311,108
CONTROL DEVICE FOR SEQUENTIAL OPERATION OF SERVICE VALVES
Filed April 22, 1940  4 Sheets-Sheet 1
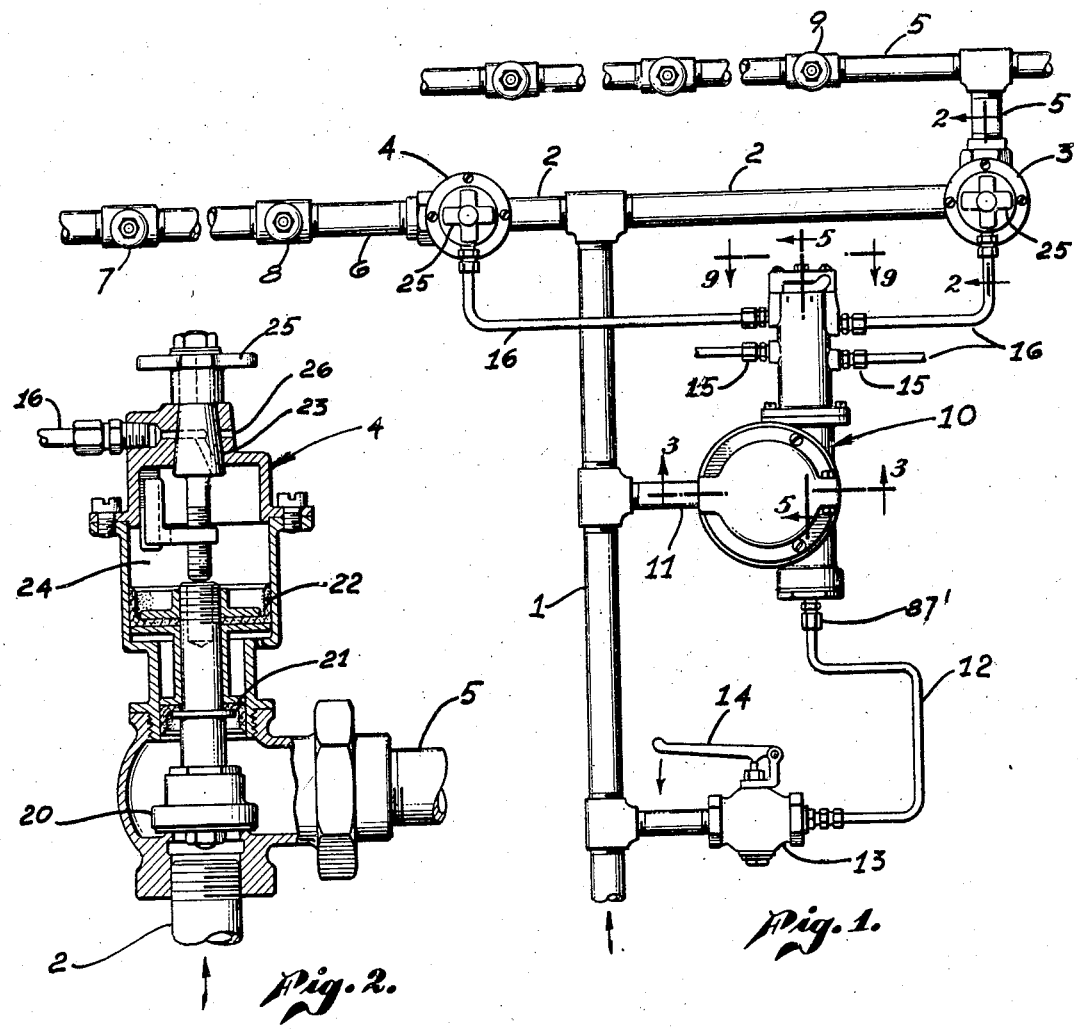
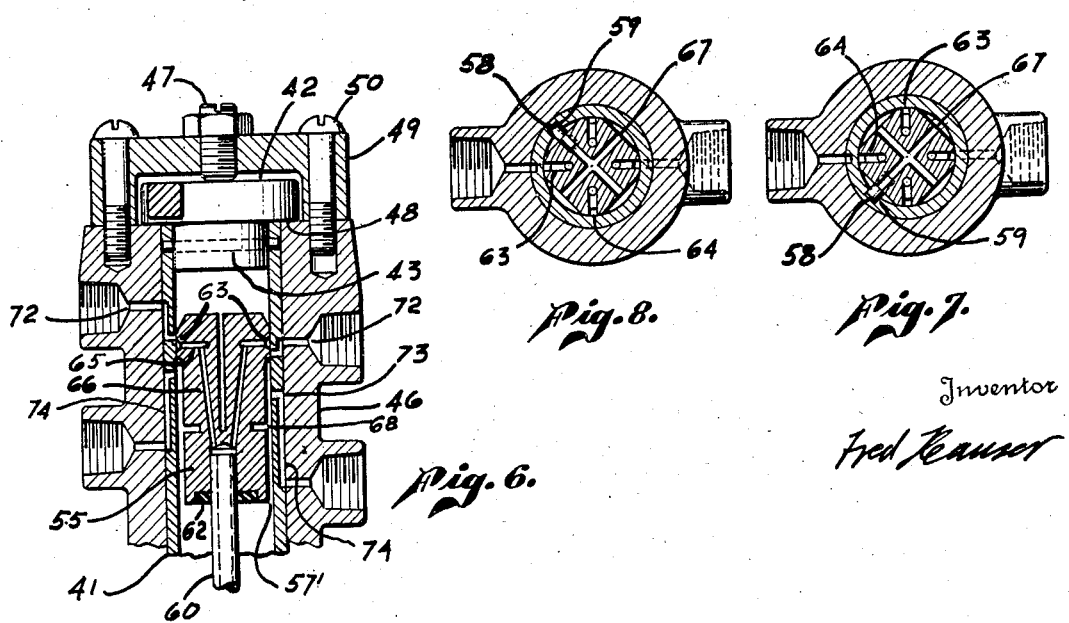
Inventor
Fred Hauser

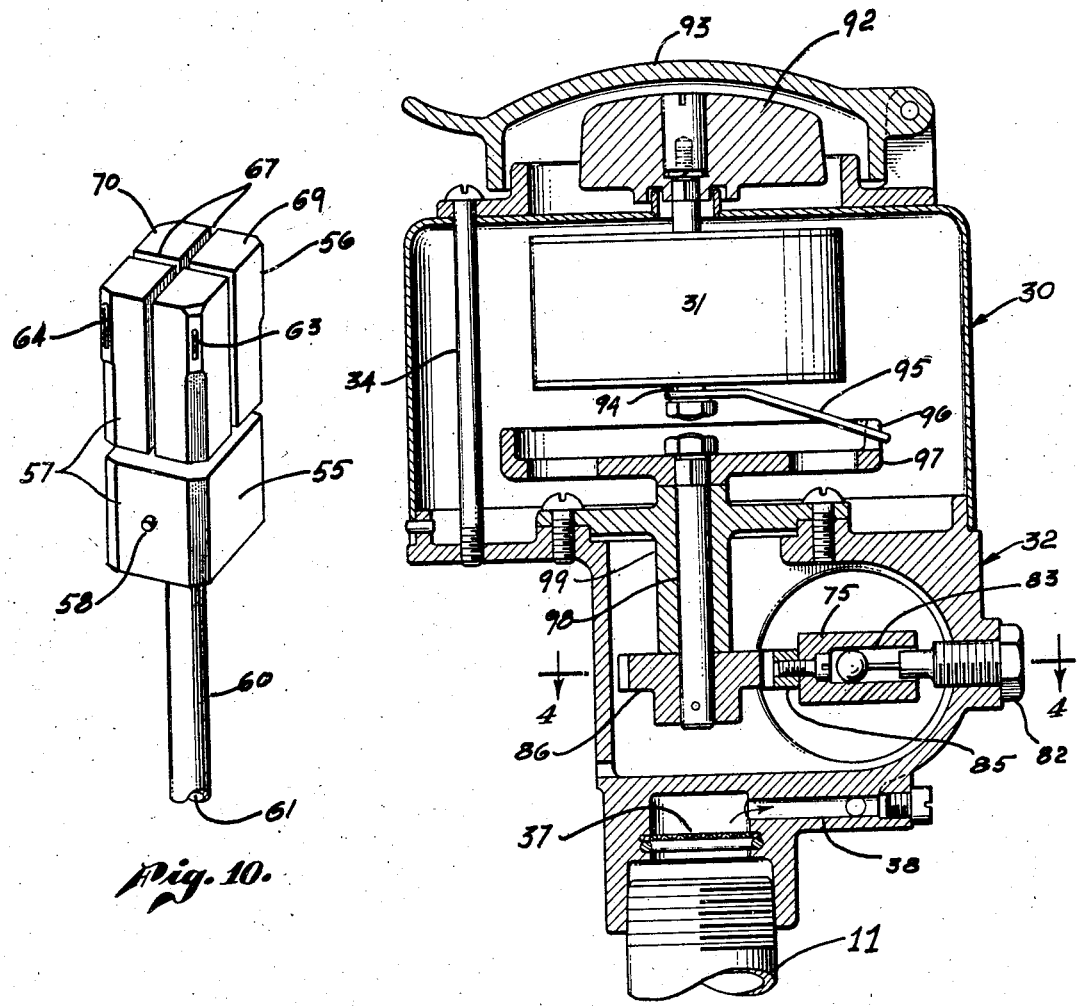
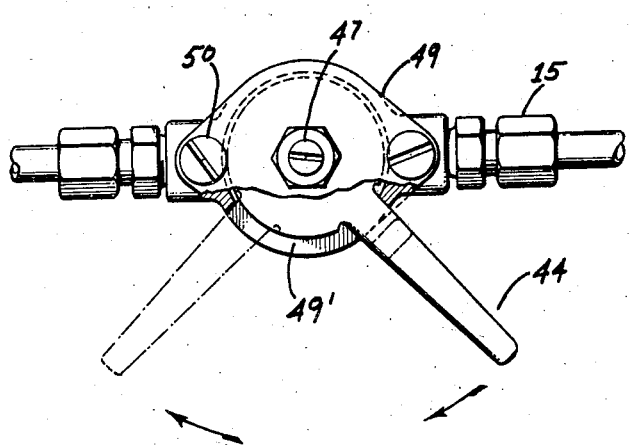

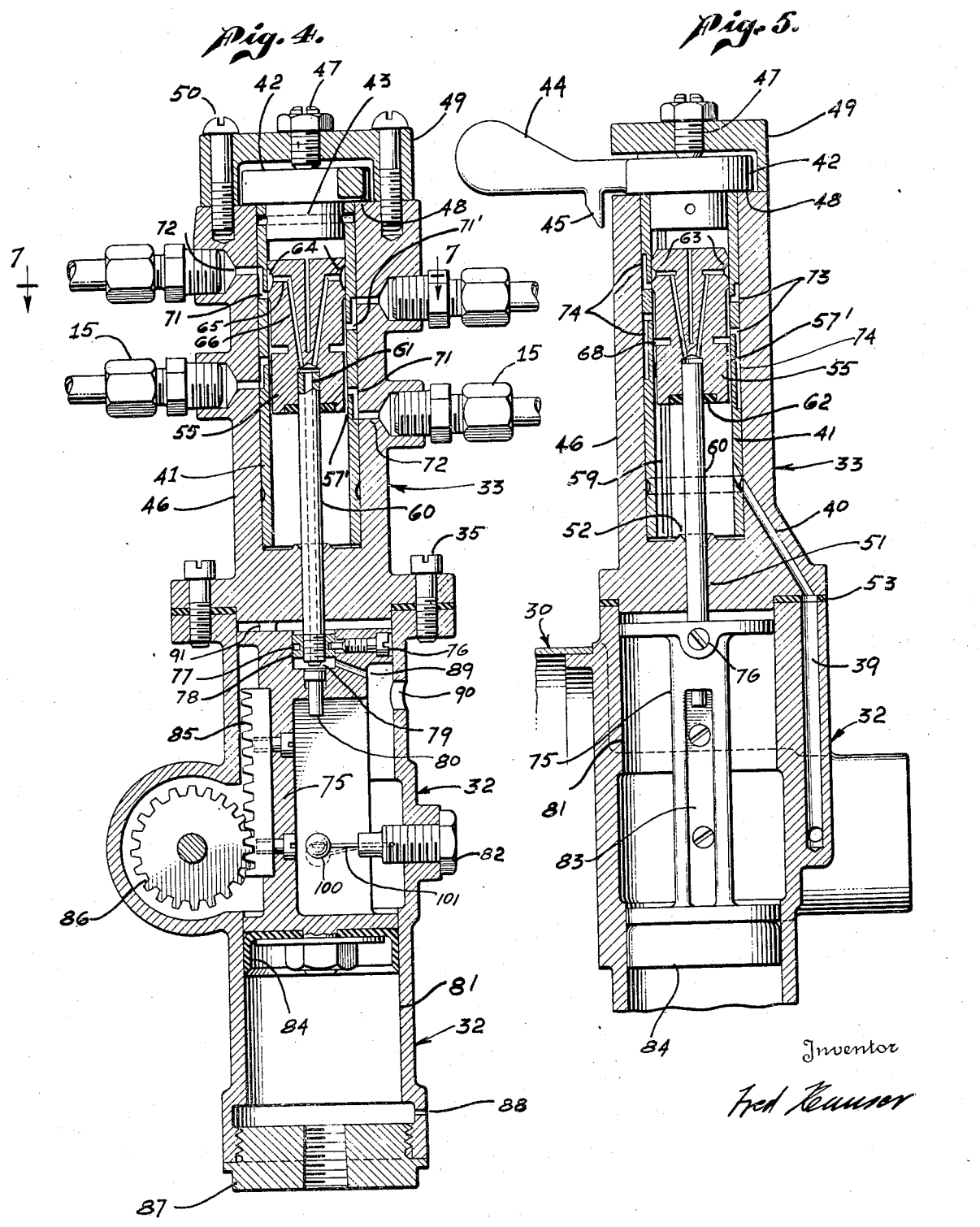

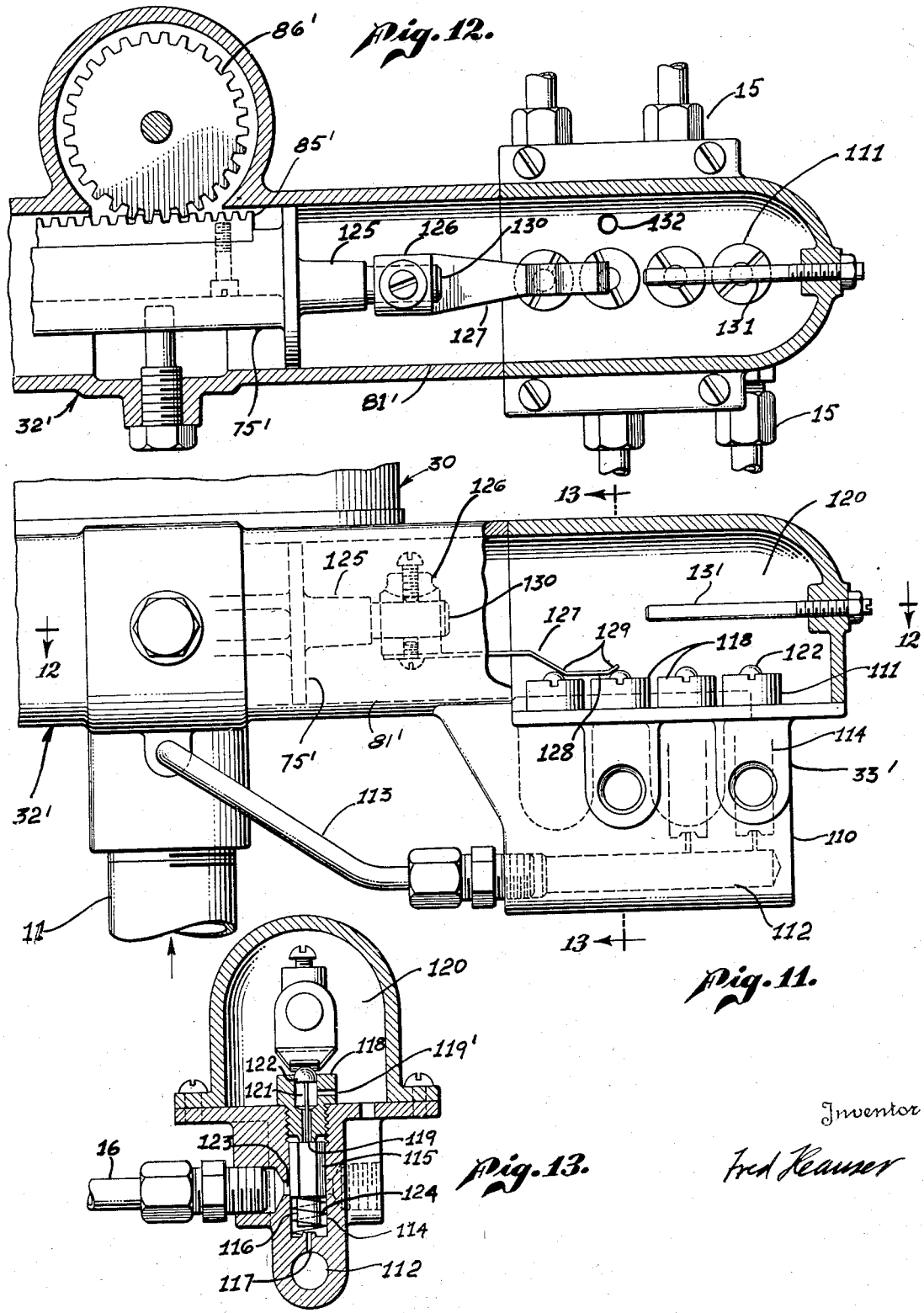

Patented Feb. 16, 1943

2,311,108

UNITED STATES PATENT OFFICE 2,311,108

CONTROL DEVICE FOR SEQUENTIAL OPERATION OF SERVICE VALVES

Fred Hauser, Los Angeles, Calif.

Application April 22, 1940, Serial No. 330,980

13 Claims. (Cl. 161—7)

This invention pertains to improvements in systems for sequential operation of service valves and is also directed to improvements and devices whereby valves controlling fluids under pressure may be sequentially operated from a remote point. Systems of this general type are most often used in the operation of sprinklers on golf courses, in parks, orchards, residences, etc., and one of the objects of the present invention is to provide control means whereby the hydraulic pressure existing in the water mains may be utilized for the purpose of energizing a motor means, which motor means then causes the sequential operation of service valves. By the term "service valves," reference is made to valves which control branch lines or banks of sprinklers whereas the control head is a device which causes sequential operation of the service valves.

Heretofore sprinkling systems have been evolved attempting to provide means for sequentially controlling service valves but in such prior means motors were required and extraneous sources of energy had to be supplied in order to drive the controlling devices. The present invention distinguishes from these prior attempts in that it employs the pressure existing in the water mains for the purpose of energizing a motor means whereby sequential operation of service valves may be attained without extraneous or added power and without the complexities attendant the supply of energy or the more delicate mechanisms utilizing the same.

Generally stated, the present invention pertains to a system including a control head, such control head including a spring motor and an hydraulic means for energizing the spring motor. This hydraulic means can be actuated from any remote point for the purpose of resetting the valve actuating means and energizing the motor means and thereby initiating a sequential operation of service valves. Moreover, the arrangement of elements hereinafter disclosed permits manual operation of individual service valves in the event such manual operation is desired.

An object of the present invention, therefore, is to disclose and provide a system for sequential operation of service valves.

A further object is to provide a combination of elements whereby two time periods during which the service valves are open may be selectively attained by operating a simple lever. Such arrangment results in sprinkling periods of different duration.

A still further object is to provide means whereby a plurality of service valves may be controlled and actuated in a simple and efficient manner by expenditure of but minimum amounts of power.

These and other objects, uses, advantages, adaptations and modifications of the invention will become apparent to those skilled in the art from the following detailed description of an illustrative embodiment of the invention. In order to facilitate understanding, reference will be had to the appended drawings, in which:

Figure 1 is a plan view, diagrammatic in general form, of a system of branch lines provided with sprinkler heads, service valves, a control head and a remote starting valve.

Figure 2 is a vertical section of a service valve.

Figure 3 is a vertical section taken along the plane 3—3 of Figure 1 and illustrating the construction of a control head.

Figure 4 is a horizontal section taken along the plane 4—4 of Figure 3 and showing the distributor plunger and the hydraulic piston for resetting the valve actuating means and energizing the motor means. The distributer plunger and the distributer sleeve are shown in a position which results in long sprinkling periods.

Figure 5 is a vertical section taken along the plane 5—5 of Figure 1 partly broken away.

Figure 6 is a horizontal section through the distributer cylinder similar to Figure 4, but showing the distributer plunger and the distributer sleeve in a position resulting in short sprinkling periods.

Figure 7 is a section taken along plane 7—7 of Figure 4.

Figure 8 is a section taken along plane 7—7 of Figure 4 but with the distributer plunger and the distributer sleeve in a position which results in short sprinkling periods.

Figure 9 is an end elevation of Figure 1 showing only the distributer cylinder.

Figure 10 is a perspective view of the distributer plunger.

Figure 11 is an exterior view partly in section of a modified form of a valve operating means.

Figure 12 is a section taken along plane 12—12 of Figure 11.

Figure 13 is a cross section taken along plane 13—13 of Figure 11.

As shown in Figure 1, a fluid pressure supply line, such as the water main 1, may be provided with branch lines 2 leading to service valves 3 and 4 which control the supply of pressure fluid or water to branch lines 5 and 6, the branch lines 5 and 6 being provided with sprinklers or outlets 7, 8, 9, etc. A control head is indicated at 10 and the bottom of this control head is connected to the pressure line 1 through pipe 11. The control head 10 may be connected as by means of tubing 12 with valve 13, said valve connecting tubing 12 with main 1. The valve 13 may be opened by operating lever 14 as indicated by arrow. Upon releasing lever 14, valve 13 closes automatically being a self closing valve.

The control head 10 is provided with a plurality of outlets 15 to which are connected suitable tubings 16 which in turn connect with service valves 3 and 4.

The service valve 3 is shown in more detail in Figure 2. Attention is called to the fact that a service valve of the character shown in the drawings is described in detail in my co-pending application filed Oct. 15, 1941, Serial No. 415,079, a substitute for the application filed by me July 11, 1938, Serial No. 218,524.

The service valve 4 illustrated in Figure 2 is simply illustrative of one form of valve which may be employed, it being understood that other types of service valves may be used instead.

Generally stated, however, the service valve 4 shown in the drawings is of the hydraulic differential piston type and includes a valve member 20 provided with a small piston including the cup leather 21 and a larger piston including the cup leather 22. The tubing 16 supplies pressure fluid from the control head through a rotatable valve body 23 into the chamber 24, such pressure fluid thereby acting upon the large end of the movable valve body and upon the large piston 22, thereby forcing the valve body 20 upon its seat so as to cut off the supply of pressure fluid from the branch inlet 2 to the outlet line 5. Manual rotation of the valve body 23, as for example by means of the cross wheel 25 (adapted to be engaged by the usual type of tools) may cut off the supply of pressure fluid to the service valve and discharge the pressure fluid within the chamber 24 through an outlet 26, thereby permitting the valve body 20 to be raised and water from branch inlet 2 to be supplied to the branch 5.

The service valve 4 may also be opened by cutting off the supply of pressure fluid to chamber 24 through tubing 16, and permitting fluid within the chamber 24 to discharge through tubing 16.

The control head is shown in detail in Figures 3 to 10 inclusive. By referring to Figures 3 and 4 it will be seen that the control head includes three main sections. An upper section is indicated at 30 and contains a motor means such as, for example, a spring clock motor 31. Beneath the section 30 is section 32 adapted to contain an hydraulic means for energizing the motor 31 and simultaneously resetting the valve actuating means to starting position. The third section generally indicated at 33 (Figures 4 and 5) is bolted to the side of section 32 and includes the distributer cylinder. The three sections 30, 32 and 33 may be held together in any suitable manner as, for example, by means of bolts 34 and 35.

The bottom of section 32 may be threadedly connected to the pipe 11. Directly above pipe 11 there may be provided a filter screen 37. A passage 38 (Figure 3) and passages 39 and 40 (Figure 5) connect the main line with the inside of distributer cylinder 41. Cylinder 41 may carry at its extreme outer end a cap 42 which is firmly pressed into cylinder 41 and made an integral part of same by pin 43. Cap 42 may also be provided with a projection which serves as a handle 44 and a pointer 45. The distributer cylinder 41 is rotatably housed in casing 46 in such a manner that a water tight seal is maintained between the outer wall of cylinder 41 and the inside wall of casing 46. The cylinder assembly, consisting of cylinder 41 and cap 42, is held axially in position by means of an adjusting screw 47 which bears against cap 42 and thereby maintains a water tight seal between it and casing 46 at 48. Cover plate 49 which carries adjusting screw 47 may be suitably fastened to casing 46 by means of bolts 50. A segmental opening 49', in cover plate 49 may be provided to accommodate handle 44 as it is partially rotated from one position to another (Figure 9). The end of casing 46 nearest section 32 may be provided with a reduced bore 51 concentric with the axis of the distributer cylinder. The inner end of bore 51 may be formed into a seat 52. A gasket 53 may be inserted between casing 46 and section 32 to prevent fluid from leaking from bores 39 and 40 into the atmosphere.

Distributer plunger or valve member 55 may be inserted in cylinder 41 in a manner that permits it to reciprocate freely back and forth in same. Figure 10 shows a perspective view of distributer plunger 55. It will be noted that plunger 55 is of square cross section with its 4 corners turned off to form segmental surfaces of a cylinder, the forward portion 56 thereof accurately fitting the bore of distributer cylinder 41, and the rearward portion 57 being relieved so as to provide a space 57' (Figures 4 and 5) between it and the wall of the distributer cylinder. A guide pin 58 pressed in plunger 55 and freely sliding in longitudinal groove 59 of cylinder 41 maintains a fixed radial relationship between plunger 55 and cylinder 41 during the reciprocating movement of the former. A hollow plunger rod or stem 60, having a bore 61 is inserted in the rearward end of plunger 55 and suitably fastened to same to form a watertight connection, preferably by soldering. A gasket 62 of nonmetallic material may be placed in an annular recess. Oblong ports 63 and 64 milled in all four forward segmental surfaces 56 of plunger 55 are in communication with hole 61 of rod 60 by conduits 65 and 66. Longitudinal slots 67 are milled in the forward portion of piston 55, and at the end of same a reduced cylindrical portion or throat 68 is formed, thus creating four resilient prongs 69, 70, etc., each of which carrying a port 63 or 64 connected with the bore 61 of hollow rod 60. Before plunger 55 is inserted in distributer cylinder 41, the four resilient prongs 69, 70, etc., are slightly bent outwardly in such a manner that the segmental surfaces 56 form part of a cylindrical surface slightly larger in diameter than the bore of cylinder 41. Once inserted in cylinder 41 such procedure guarantees a continuous water tight fit between the contacting surfaces. At this point attention is called to the fact that the ports 63 and 64 in distributer plunger 55 are not of the same length, but the port diagonally opposite port 64 (not shown in Figure 10, but shown in Figure 4) is of identical length with port 64, and the port diagonally opposite port 63 is of identical length with port 63, but one such pair is longer than the other. There are therefore two pairs of ports which may be designated for the purpose of clearness as the long ports 64 (Figure 4) and the short ports 63 (Figure 5). Corresponding with, and at times communicating with the long ports 64 are various radial ports 71 (Figure 4) drilled through the wall of distributer cylinder 41, and longitudinally extended on the outside of the cylinder wall to communicate with the outlet or service ports 72 in casing 47. The ports 72 are then connected as by means of tubings 16 to service valves 3, 4, etc. Similarly, ports 73 and their longitudinal extensions 74 are formed in distributer cylinder 41 to correspond with the short ports 63 of the plunger 55 (Figures 5 and 6). It is evident that due to the fact that Figure 5 is a vertical cross section taken on line 5—5 Figure 1, ports 73 and extensions 74 are not in communication with outlet ports 72 and no water may flow through them when cylinder 46 is in the position as shown in Figure 5.

The end of plunger rod 60 which extends through the end wall of casing 46 is loosely connected to one end of piston 75 by means of retaining screw 76 projecting into circular groove 77 of nut 78 which is screwed onto plunger rod 60. The end of plunger rod 60, adjacent to nut 78 terminates in valve seat 79 formed around hole 61. Directly opposite valve seat 79, is slidably inserted plunger 80 which is made of a nonmetallic material, preferably hard rubber. Piston 75 is received by cylinder 81, formed in section 32 and projecting from both sides of section 32. Dog screw 82 engages longitudinal slot 83 and prevents piston 75 from revolving but permits same to freely slide longitudinally in cylinder 81. Piston 75 consists of three portions: one end portion to which is secured plunger rod 60, the opposite end portion which carries cup leather 84 mounted in customary fashion, and a center portion which is of oblong shape and includes a longitudinal slot 83. Opposite to this slot there is bolted a rack 85 which engages gear 86. Cap 87 seals the end of cylinder 81 and may be provided with tubing connection 87' (Figure 1) and tubing 12 which leads to valve 13. A bleeder outlet 88 establishes communication between the inside of cylinder 81 and the atmosphere. Two other bleeder outlets 89 and 90 are intended to permit any operating fluid flowing through hollow plunger rod 60 to reach atmosphere. Stop lug 91, cast on end of casing 46, restricts the forward movement of piston 75.

It is to be remembered that it is desired to sequentially operate the various service valves 3, 4, etc. In order to accomplish this, the motor 31 (Figure 3) may be wound by hand, as, for example, by means of a hand knob 92 extending from the top of the housing section 30 and protected from the elements by means of a pivoted cover plate 93 mounted on the top of the housing section 30. The motor 31 consists of a standard clock mechanism that is now being manufactured and on the market and it is characterized by the frictional mounting of the main drive shaft 94, whereby the same may be manually rotated in either direction to wind or unwind the main spring of the clock or spring motor. The clock is wound or energized by turning main drive shaft 94 in counter-clockwise direction. The main drive shaft 94 of the motor 31 may be provided with the arm 95, the end thereof being received in a slot 96 of wheel 97. The wheel 97 is attached to one end of a shaft 98 journaled in a bearing bracket 99 bolted to the top of section 32. This shaft 98 may have fastened to its other end gear 86 which meshes with rack 85.

Normally, when none of the sprinklers 7, 8, 9, etc., of the system are operating, and when all service valves 3, 4, etc., are closed, and the distributer plunger 55 and piston 75 are in an extreme rearward position (not shown in the drawings) and are held there by the clockwise torque of gear 86 which in turn is influenced by spring motor 31. In this position gasket 62 is pressed firmly against valve seat 52 due to the clockwise torque of gear 86 meshing rack 85. Also plunger 80 is pressed against valve seat 79 by reason of ball 100 mounted on the end of a spring wire 101. Ball 100 and spring wire 101 are then in a position shown in dotted lines. Such a method of sealing both outlets of cylinder 41 prevents any leakage through bore 51 or any leakage through bore 61 originating from an inadequate sealing around ports 64 and 63, during the period while the sprinkling system is not in operation. Since the inside of distributer cylinder 41 is connected to water main 1 through ports 40, 39, 38, and pipe 11, the full hydrostatic pressure of the system is maintained inside cylinder 41. The full hydrostatic pressure is also maintained in chamber 24 of the service valves 3, 4, etc., by reason of their connections through tubing 16 and ports 72 and 71 to cylinder 41. All service valves 3, 4, etc., are closed as shown in Figure 2 when distributer plunger 55 is in an extreme rearward position. The sprinkling operation may be instituted in two different manners: first, by turning hand knob 92 in counterclockwise direction as far as possible, or second, by operating lever 14 of valve 13 as indicated by arrow (Figure 1). If the first method is used piston 75 is moved forward by the action of gear 86 on rack 85 until stopped by lug 91. Such forward movement of piston 75 also moves plunger rod 60 and distributer plunger 55 forward to the position shown in Figure 4. In this position port 71 is closed by the forward portion 56 of distributer plunger 55. Upon release of hand knob 92 by the operator the spring motor 31 starts to function immediately and slowly rotates gear 86 in a clockwise direction due to the fact that the driving spring in spring motor 31 had been wound by above mentioned manual counterclockwise rotation of hand knob 92. Such a rotation, therefore, not only moves distributer plunger 55 into the starting position but also energizes spring motor 31. The clockwise rotation of gear 86 slowly returns piston 75 and plunger 55, thereby bringing port 64 into communication with port 71. In Figure 4 port 71 is just beginning to communicate with port 64. In this position the pressure fluid from chamber 24 of service valve 4 may begin to be discharged through ports 65 and 66 into bore 61 of plunger rod 60 and from there through ports 89 and 90 to the atmosphere. This causes the service valve 4 connected to this particular port to open, and to stay open until port 64 has passed port 71 and the pressure is again restored in chamber 24 of the service valve. Just as this valve closes the opposite port 64 of plunger 55 communicates with port 71' and the service valve 3 opens. All valves are in this manner successively opened and closed. Just before plunger 55 nears the end of its return stroke the last valve is closed. The length of time the service valves are open depends on the speed at which drive shaft 94 of spring clock motor 31 runs.

Generally used sprinkling periods vary from 5 minutes to 40 minutes. If the sprinkling operation is initiated by the second method, namely by operating lever 14, then water from the main enters cylinder 81 through tubing 12 and pushes piston 75 forward until stopped by lug 91. As lever 14 is released by the operator, valve 13 closes and the pressure fluid in cylinder 81 discharges through the small vent 88 into the atmosphere, and the spring motor 31 slowly returns piston 75 and distributer plunger 55 as described above. In this second method of initiating the sprinkling operation the spring motor 31 is wound by the action of rack 85 on gear 86.

It is desirable at times to have sprinkling periods of different duration available. Such a change in the duration of the sprinkling periods may be accomplished by rotating handle 44 (Figure 9) from one extreme position to the other. It is evident from the foregoing detail description that the distributer cylinder 41 also rotates a portion of a revolution (90° in the case shown in the drawings) whenever handle 44 is rotated from one extreme position to the other. And since distributer plunger 55 is held in a fixed radial relationship in regards to cylinder 41 by reason of pin 58 sliding in groove 59, said plunger 55 also rotates an identical amount as does cylinder 41. Figure 7 is a section taken along plane 7—7 of Figure 4 and shows the position of groove 59 and pin 58 when long ports 64 of distributer plunger 55 are communicating with ports 71 in casing 46. Such alignment of the ports results in the long sprinkling period. As handle 44 (Figure 9) is rotated to a position shown in dotted lines, the distributer cylinder 41 and plunger 55 assume the position relative to ports 71 as shown in Figures 6 and 8. In such a position the short ports 63 of distributer plunger 55, through ports 73 and their longitudinal extensions 74 are in communication with ports 72 of casing 46. Such an alignment of ports results in a short sprinkling period. Figure 6 shows such an alignment of ports and shows distributer plunger 55 in a position in which it is just beginning to open one of the ports 73 to the pressure inside distributer cylinder 41, and to open another port 73 to the atmosphere, which results in closing service valve 4 and opening service valve 3 (Figure 1).

Should it be desired to stop the sequential operation of the service valves, 3, 4, etc., i. e., to stop the sprinkling process, before spring motor 31 has returned distributer plunger 55 to its normal resting position, and while any one of the service valves 3, 4, etc., might be open, the operator merely has to rotate hand knob 92 in a clockwise direction thereby returning all the reciprocating members to a resting position, and also unwinding the main spring of spring motor 31.

Figures 11, 12, and 13 show a modified construction of the control head 10. Section 30 as shown in Figure 3 is used in the same form in the modified construction (Figure 11). Beneath section 30 is section 32′ which contains an hydraulic means for energizing the motor 31. Piston 75′ carries rack 85′ which meshes with gear 86′ as previously described. Formed at the end of cylinder 81′ is projection 110, in which are mounted a plurality of pilot valves 111. A bore 112 connecting with main 1 by means of tubing 113 and pipe 11 forms a pressure chamber in the lower portion of projection 110, and is always under line pressure.

The projection 110 includes a plurality of vertical bores 114 adapted to receive valved members 115. These valve members 115 may consist of nonmetallic material such as, for example, vulcanized rubber having a polygonal cross section and preferably including a stepped portion or portion of reduced diameter as, for example, the portion 116 (Figure 13). Each of the bores, such as the bore 114 is provided with an axial port 117 in communication with the pressure chamber 112. The upper end of each bore 114 is provided with a removable threadedly connected valve seat plug 118 having a port 119 axial to the bore 114 and a transverse outlet port 119′ leading to the bleeder chamber 120. Loosely movable within the valve seat plug 118 is a pin 121 provided with a head 122 extending from the plug.

At right angle to the bores 114 and communicating with same are ports 123. The various ports 123 are then connected as by means of tubings 16 with the service valves such as the service valve 4.

At this point attention is called to the fact that when fluid under pressure is admitted to the chamber 112 from the main 1, such fluid under pressure will pass through the port 117 and into the bore 114. In view of the fact that the valve member 115 is provided with a light spring 124 around reduced section 116, the valve member 115 will be raised and seated against the axial port 119 of the valve seat plug 118. Fluid under pressure will flow past the valve member 115 into the radial port 123 associated therewith and through the tubing 16 to the service valve 4. In service valve 4 the fluid under pressure will move the differential piston assembly downwardly so as to seat the valve 20 and thereby prevent the flow of fluid from the pipe 2 into the branch line 5. Ordinarily, all of the various pilot valve members 115 are in a raised position and are seated against the axial ports 119 of the valve seat plugs 118. In such a position, all of the service valves 3, 4, etc. are closed and the heads 122 on the pin members 121 are protruding above the valve seat plugs 118.

Slidably fastened to extension 125 of piston 75′ is a collar 126, on the underside of which is secured spring arm 127, made of some flexible material preferably spring bronze. The outer end of spring arm 127 forms a shoe having a flat portion 128 and two upwardly curved portions 129. Upon instituting sprinkling operation, piston 75′ is moved forward, either manually or hydraulically as previously described, until end 130 of extension 125 contacts stop screw 131. In this position the flat portion 128 of spring arm 127 is just forward of head 122 of the first pilot valve 111. As piston 75′ is slowly returned by action of spring motor 31, the shoe portions 128 and 129 of spring arm 127 contact successively the protruding heads 122 of the pilot valves 115 and hold such heads down for a desired length of time. The pin 121, which extends through the axial port of the valve seat plug 118 forces valve member 115 downwardly so as to seat same on the valve port 117 leading to the pressure chamber 112. When the valve member 115 is in such depressed position then the pressure fluid from one of the service valves 3, 4, etc., may be discharged through tubing 16, and port 123 into the bore 114 and out through port 119 into the bleeder chamber 120 and into the atmosphere through bleeder port 132. Such a closing of port 117 and simultaneous opening of bleeder port 119 opens one of the service valves 3, 4, etc. As the shoe portions 128 and 129 get out of contact with pin head 122, valve member 115 again closes bleeder port 119 and opens port 117 restoring the full pressure in tubing 16 and consequently closing one of the service valves 4, 5, etc.

It will be understood that in a complete system of piping, valves and controls, one or more control heads may be used, depending upon the diameter of the pressure fluid mains, the number of service valves carried by the branches thereof and the volume of fluid which it is desired to pass through each of such service valves. Moreover, the control heads need not include the hydraulic energizing means contained within the cylinder 81 of section 32, but rack 85 may be directly connected to plunger rod 60. Such hydraulic energizing means although greatly facilitate the operation of the devices. The pressure fluid supplied to the hydraulic energizing means may be supplied from any suitable source and the valve 13 may be located at any desired place in the conduit supplying such pressure fluid.

Those skilled in the art will further understand that the diameter of plunger rod 60 may be so selected in regards to commonly occurring water pressures in commercial or domestic water supplies that the force tending to return the plunger 55 rearward, (said force being directly proportionate to the water pressure) may be approximately offset by the friction caused by sliding piston 75, cup leather 84 and the rack and gear drive. The spring motor therefore may have to supply only a minute amount of energy, either in supplying energy to return piston 75 or to prevent it from returning any faster than desired, but at all times timing such sliding return movement. All such changes, modifications and adaptations as come within the scope of the appended claims are embraced thereby.

Having thus described my invention I claim:

1. A control head for sequential operation of service valves comprising: a fluid-tight casing, a bore within said casing provided with a pressure fluid inlet and a plurality of service ports, a valve member arranged to reciprocate within said casing bore, said valve member being provided with outlet ports, a hollow stem secured to said valve member and protruding through said fluid-tight casing and connecting said outlet ports with the atmosphere, and means for sliding said valve member within said casing bore to sequentially connect said service ports with said valve outlet ports and said hollow stem.

2. A control head for sequential operation of service valves comprising: a fluid-tight casing, a bore within said casing provided with a pressure fluid inlet and a plurality of service ports, a valve member arranged to reciprocate within said casing bore, said valve member being provided with outlet ports, a hollow stem secured to said valve member and protruding through said fluid-tight casing and connecting said outlet ports with the atmosphere, and means for sliding said valve member within said casing bore to sequentially connect said service ports with said valve outlet ports and said hollow stem; and sealing means arranged to become operative to close said hollow stem when said valve member is at rest position and thereby preventing any leakage of pressure fluid from inside of said fluid-tight casing.

3. A control head for sequential operation of service valves comprising: a fluid-tight casing, a bore within said casing provided with a pressure fluid inlet and a plurality of service ports, a valve member arranged to reciprocate within said casing bore, said valve member being provided with outlet ports, a hollow stem secured to said valve member and protruding through said fluid-tight casing and connecting said outlet ports with the atmosphere, and means for sliding said valve member within said casing bore to sequentially connect said service ports with said valve outlet ports and said hollow stem; and means, selectively operable, adapted to alter the time interval during which said service ports are connected with said valve outlet ports.

4. A control head for sequential operation of service valves comprising: a fluid-tight casing, a bore within said casing provided with a pressure fluid inlet and a plurality of service ports, a valve member arranged to reciprocate within said casing bore, said valve member being provided with outlet ports, a hollow stem secured to said valve member and protruding through said fluid-tight casing and connecting said outlet ports with the atmosphere, and means for sliding said valve member within said casing bore to sequentially connect said service ports with said valve outlet ports and said hollow stem; and motor means arranged to impart uniform sliding motion to said valve member during its operating stroke.

5. A control head for sequential operation of service valves comprising: a fluid-tight casing, a bore within said casing provided with a pressure fluid inlet and a plurality of service ports, a valve member arranged to reciprocate within said casing bore, said valve member being provided with outlet ports, a hollow stem secured to said valve member and protruding through said fluid-tight casing and connecting said outlet ports with the atmosphere, and means for sliding said valve member within said casing bore to sequentially connect said service ports with said valve outlet ports of said hollow stem; and motor means arranged to impart uniform sliding motion to said valve member during its operating stroke; and hydraulic starting means arranged to move said valve member into starting position and simultaneously energize said motor means.

6. A control head for sequential operation of service valves comprising: a fluid-tight casing, a bore within said casing provided with a pressure fluid inlet and a plurality of service ports, a valve member arranged to reciprocate within said casing bore, said valve member being provided with outlet ports, a hollow stem secured to said valve member and protruding through said fluid-tight casing and connecting said outlet ports with the atmosphere, and means for sliding said valve member within said casing bore to sequentially connect service ports with said valve outlet ports and said hollow stem; and motor means arranged to impart uniform sliding motion to said valve member during its operating stroke; and manually operable means arranged to move said valve member into starting position and simultaneously energize said motor means.

7. A control head for sequential operation of service valves comprising: a fluid-tight casing, a bore within said casing provided with a pressure fluid inlet and a plurality of service ports, a valve member arranged to reciprocate within said casing bore, said valve member being provided with outlet ports, a hollow stem secured to said valve member and protruding through said fluid-tight casing and connecting said outlet ports with the atmosphere, and means for sliding said valve member within said casing bore to sequentially connect said service ports with said valve outlet ports and said hollow stem; and motor means arranged to impart uniform sliding motion to said valve member during its operating stroke; and hydraulic starting means arranged to move said valve member into starting position and simultaneously energize said motor means, said hydraulic starting means including a cylinder, a reciprocating piston in said cylinder a driving connection between said reciprocating piston and said motor means, and a connection between said reciprocating piston and said hollow stem, a fluid pressure conduit connected to said cylinder, and a valve means in said conduit located at a point removed from said control head for supplying pressure fluid to said cylinder to actuate said reciprocating piston and move said valve member into starting position and simultaneously energize said motor means.

8. A control head for sequential operation of service valves comprising: a fluid-tight casing, a bore within said fluid-tight casing connected at all times to the fluid supply under pressure and provided with a plurality of service ports, a valve member arranged to reciprocate within said casing bore, said valve member being provided with one or more outlet port or ports in communication with the atmosphere, and means for sliding said valve member within said casing bore for successively bringing said service ports in communication with said outlet port or ports without diminishing the pressure within said casing bore.

9. A control head for sequential operation of service valves comprising: a fluid-tight casing, a bore within said casing provided with a plurality of service ports, a cylinder within said casing bore provided with a pressure fluid inlet and at least two groups of intermediate ports, each of said intermediate ports in any one group being adapted to be connected to a corresponding service port, means for rotating said cylinder to bring any desired group of said intermediate ports in communication with said service ports, a valve member within said cylinder, said valve member being provided with outlet ports of different sizes, each of said outlet ports being aligned radially with a corresponding group of intermediate ports, a hollow stem communicating with said outlet ports and protruding through said fluid-tight casing, and means for sliding said valve member to successively bring said intermediate ports of the group then communicating with said service ports, in communication with the corresponding outlet ports.

10. A control head for sequential operation of service valves comprising: a fluid-tight casing, a bore within said casing provided with a pressure fluid inlet and a plurality of service ports, a valve member arranged to reciprocate and rotate within said casing bore, said valve member being provided with outlet ports of different sizes, a hollow stem communicating with said outlet ports and protruding through said fluid-tight casing, and means for rotating said valve member to bring any desired of said outlet ports in radial alignment with said service ports, and means for sliding said valve member to successively bring said service ports in communication with a previously aligned outlet port; said alignment of ports resulting in time intervals of different duration during which said service ports are in communication with an outlet port.

11. In a system for sequential operation of service valves: a control head comprising a fluid-tight casing, a bore within said casing connected at all times to the fluid supply under pressure and provided with a plurality of service ports, a service valve connected to each of said service ports, a valve member arranged to reciprocate within said casing bore, said valve member being provided with at least one outlet port in communication with the atmosphere, and means for sliding said valve member within said casing bore for successively connecting said service ports, one at the time with an outlet port, each of said service valves being adapted to open when connected to said outlet port and to close when connected to the fluid supply under pressure.

12. In a system for sequential operation of service valves: a control head comprising a fluid-tight chamber adapted to be connected at all times to the fluid supply under pressure and provided with a pluraltiy of service ports, a service valve connected to each of said service ports, a valve member arranged to reciprocate within said fluid-tight chamber, said valve member being provided with an outlet port in communication with the atmosphere; and means for sliding said valve member within said casing bore for successively connecting said service ports, one at the time with said outlet port and thereby controlling the sequential operation of said service valves.

13. In a control head, the combination of a spring motor, a fluid-tight chamber provided with a plurality of service valve outlets, and a pressure fluid inlet, a reciprocating member within said fluid-tight chamber provided with outlet ports in communication with the atmosphere, said reciprocating member being operably connected to said spring motor and adapted for sequentially connecting said service valve outlets with said outlet ports, and means for manually and hydraulically energizing said spring motor and simultaneously setting said reciprocating member into starting position, said means being adapted to permit manually de-energizing of said spring motor at will and simultaneously resetting said reciprocating member into rest position.

FRED HAUSER.